United States Patent
Son et al.

(10) Patent No.: US 6,700,701 B1
(45) Date of Patent: Mar. 2, 2004

(54) THREE DIMENSIONAL IMAGING SCREEN FOR MULTIVIEWER

(75) Inventors: Jung Young Son, Sungnam (KR); Vadim V Smirnov, Saimt-Fetervruge (RU); Hyuk Soo Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/019,304

(22) PCT Filed: Jul. 13, 2000

(86) PCT No.: PCT/KR00/00760

§ 371 (c)(1), (2), (4) Date: Jan. 8, 2002

(87) PCT Pub. No.: WO01/04665

PCT Pub. Date: Jan. 18, 2001

(30) Foreign Application Priority Data

Jul. 13, 1999 (KR) .......................... 1999-28253

(51) Int. Cl.⁷ .................. G03B 21/56; G03B 21/60; G02B 27/22

(52) U.S. Cl. .................. 359/443; 359/455; 359/458; 359/462

(58) Field of Search .................. 359/443, 449, 359/454, 455, 456, 457, 458, 460, 462

(56) References Cited

U.S. PATENT DOCUMENTS 3,208,341 A * 9/1965 Hosterman, Jr. et al. ... 359/454
4,390,239 A   6/1983 Huber ..................... 359/446
4,559,556 A   12/1985 Wilkins ..................... 358/88
5,064,273 A   11/1991 Lee ......................... 359/457
5,930,037 A * 7/1999 Imai ........................ 359/462
6,353,500 B1 * 3/2002 Guigan et al. ............. 359/456

FOREIGN PATENT DOCUMENTS

DE    2248873    4/1973
JP    9-274159   10/1997

OTHER PUBLICATIONS

English Language Abstract of JP 9–274159.

* cited by examiner

Primary Examiner—Christopher Mahoney
(74) Attorney, Agent, or Firm—Greenblum & Bernstein, P.L.C.

(57) ABSTRACT

The present invention employs a beam dividing prism corresponding to a size of a single pixel on a screen in order to create a plurality of viewing zones for multi-viewer, in which a prism panel having an 1-dimensional or 2-dimensional arrangement of a prism cell for dispersing beam in various directions is coupled to the 3-dimensional image projection screen in order to increase the number of the viewing zones, and in which the number and position of the available viewing zones are determined by the number and a relative position of disperse surfaces in the prism cell.

By using the present invention, the desired number of the viewing zones can be created by selectively adopting the prism cells, so realizing the 3-dimensional image display system for multi-viewer.

18 Claims, 7 Drawing Sheets

(a)

(b)

(c)

(d)

(e)

(f)

(g)

(h)

THREE DIMENSIONAL IMAGING SCREEN FOR MULTIVIEWER

TECHNICAL FIELD

The present invention relates to a 3-dimentional imaging screen for multi-viewer, and in particular to a 3-dimentional imaging screen for simultaneously watching a 3-dimentional image by multi-viewer without wearing glasses, in which the screen comprises a beam dividing prism corresponding to a pixel on screen, the beam dividing prism dividing an incident beam on the screen into a vertical and/or horizontal direction according to the shape thereof.

BACKGROUND ART

It has been studied about a display device with which viewers may watch a conventional 2-dimentional image, such as television image, like a 3-dimentional image. In order to watch the conventional 3-dimentional image, the viewers generally wear a pair of polarized glasses which make the 3-dimentional image, by using a visual timing difference, from the 2-dimentional images which were made by using a plurality of cameras when taking images for a television program or movie.

For an example, the U.S. Pat. No. 4,559,556 discloses a system for viewing three dimentional images. The viewing system comprises a filter mat having two juxtaposed polarizing filters for placement over a television viewing screen or other rear surface projection device in substantial registry with two similarly juxtaposed and slightly different images of a common scene or subject. The polarizing filters are oriented on different axes to polarize the light from the two images on different axes. The viewer observes these polarized images through eyeglasses.

However, it has caused expenses and inconvenience according to the manufacturing the conventional 3-dimentional image and using glasses. In order to overcome the problems, there is developed a 3-dimentional image screen by a viewing zone recently, in which the 3-dimentional image screen by the viewing zone embodies the 3-dimentional image on the image incident screen itself, which enables a lot of viewer to watch the image without wearing the polarized glasses.

Preferably the viewing zone for displaying the 3-dimentional image should be generated as many as possible. For that reason, there is a method that a plurality of image incident devices are used as many as the viewing zones with use of such as a lenticular, a spherical reflective panel or a Fresnel lens for projecting the image. In addition, there is another method which uses a holographic screen for generating a plurality of viewing zones on a single screen.

The holographic screen uses a hologram serving as a kind of optical elements. When writing the hologram, the holographic screen writes several phases of an oriented object having diffrent direction on one hologram by multi-exposing with moving position of a photosensitive panel or the object, or with moving the position of the photosensitive panel and with changing the object itself.

The method for generating a plurality of viewing zones with use of a lenticular, a spherical reflective panel or a Fresnel lens can be easily embodied for providing the 3-dimensional image but not good in efficiency. Particularly, though it can enlarge size of screen for expanding the size of the viewing zone, the lenticular screen is still inefficient in fact that only a few viewers can watch the screen in comparison with the size of the screen.

In detail, the method for expanding size of the viewing zone with use of the lenticular screen may be achieved by enlarging the size of the lenticular lens and increasing the number of the images in different viewing directions. For example, assuming that a shoulder of a viewer has a width of about 40 cm, the viewing zone requires at least 80 cm width for two viewers to watch the 3-dimentional image at the same time. Assuming that a distance between eyes is 6.5 cm, at least 13 images having different viewing directions are required in order to form the 80 cm width viewing zones. Therefore, there is a technical limitation in that the number of the images having different viewing directions as well as the size of the projection lens should be continuously increased because the viewing zone size should be steadily increased by over 40 cm in order to increase the number of viewers at the same time.

Accordingly, the method to expand the size of the viewing zone among various methods for multi-viewer is not efficient comparing with the method increasing the number of the viewing zones.

In addition, multi-exposure hologram using the holographic screen also has some problems in a screen brightness because the diffraction efficiency decreases in an inverse proportion to a root value of the number of the multi-exposure.

DISCLOSURE OF THE INVENTION

The present invention is designed to solve the above problems. Therefore, on object of the present invention is to provide a 3-dimentional imaging screen for multi-viewer which maintains a proper screen brightness on the single screen such that a plurality of viewers can watch the screen at the same time, and which configures the number of the viewing zones according to the number of the viewers.

The object of the present invention is accomplished by providing a configuration of a screen, which can make the number of the viewing zone increased, resulting that the multi-viewer may watch the 3-dimentional image simultaneously.

The technical spirit of the present invention is achieved by using a prism panel together with a 3-dimentional image projection screen, in which the prism panel consists of an 1-dimentional or 2-dimentional array of prism cells which can disperse a projected image to each direction determined by each pixel.

In other words, the 3-dimentional imaging screen for multi-viewer which projects an object on the screen such that viewers watch a 3-dimentional image, wherein the screen comprises a 3-dimentional image projection screen positioned to a direction of an incident beam of the image, and a prism panel is formed with prism cell having a plurality of disperse surfaces of the incident beam on a rear surface of the 3-dimentional image projection screen, whereby the number of viewing zones is corresponding to the number of the disperse surfaces of the prism cell.

The prism panel is coupled to the rear surface of the 3-dimentional image projection screen, and the 3-dimentional image projection screen has enough thickness not to generate an interference effect such as a moir__ interference pattern.

The prism panel is installed to the rear surface of the 3-dimentional image projection screen having a predetermined distance therebetween, and the distance between the 3-dimentional image projection screen and the prism panel is properly spaced apart not to generate the interference effect such as a moir__interference pattern.

The prism panel is formed and integrated to the rear surface of the 3-dimentional image projection screen in a emboss or engrave manner, and the 3-dimentional image projection screen has enough thickness not to generate the interference effect such as moir_interference pattern.

BRIEF DESCRIPTION OF THE DRAWINGS

Other objects, features and advantages of the present invention will become more apparent from the description of a preferable embodiment with reference to the drawings, in which.

BEST MODE FOR CARRYING OUT THE INVENTION

Hereinafter, configurations and operations of embodiments of the invention will be described with the reference to the accompanying drawings in detail. First of all, for the best understanding of the present invention, there will be explained a principle for forming a viewing zone in the image projection system.

Figure 1:
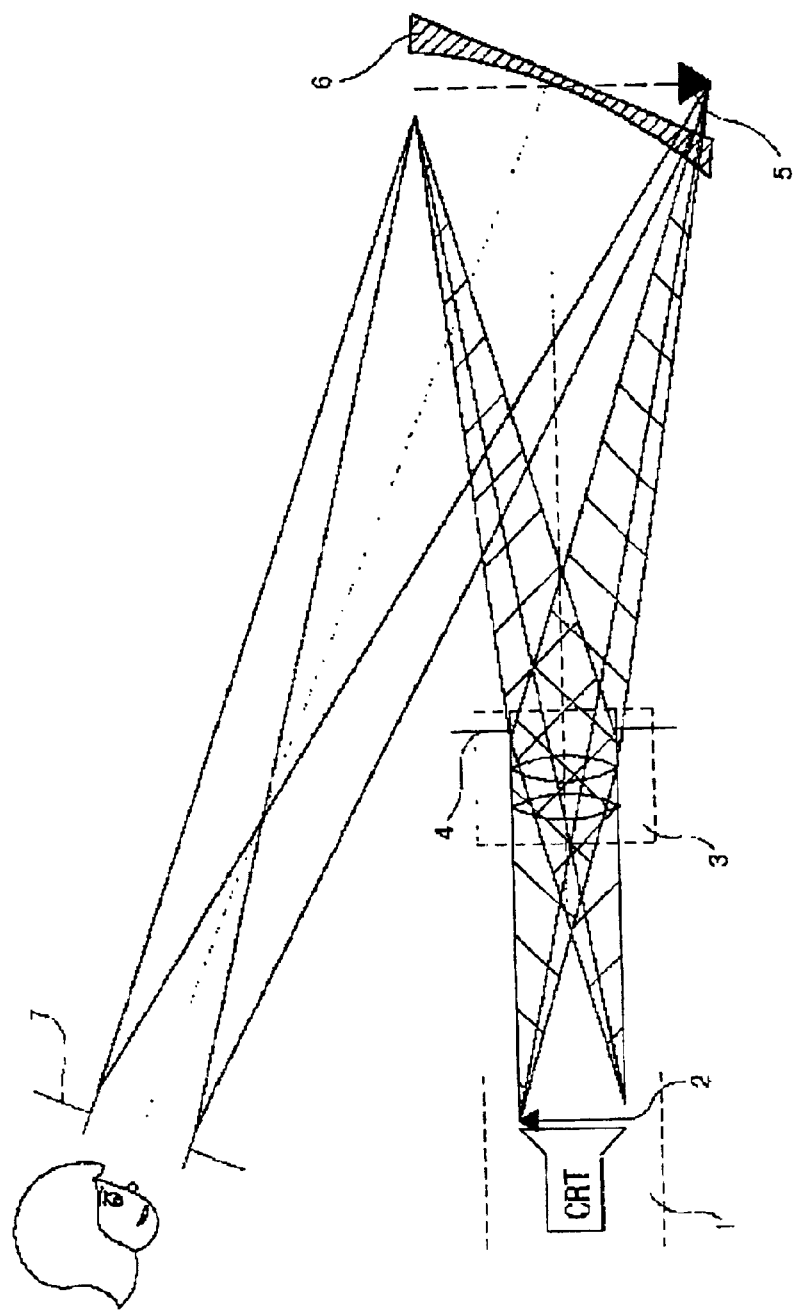
FIG. 1 is for showing a principle of forming a viewing zone of an image projection screen having characteristics of a spherical reflective panel.

FIG. 1 is for showing how the viewing zone is formed in case of projecting an image on an image projection screen having characteristics of a spherical reflective mirror.

As shown in FIG. 1, the image displayed on an image display screen 2 of an image generating unit 1 is projected on the image projection screen 6 through a projection lens 3. The image 5 projected on the image projection screen 6 can be watched by viewers in an area, where an image of an egress opening unit 4 of the projection lens 3 is shown up by way of the image projection screen 6. The area where the image of the egress opening unit 4 of the projection lens 3 is shown is called a viewing zone.

Figure 2:
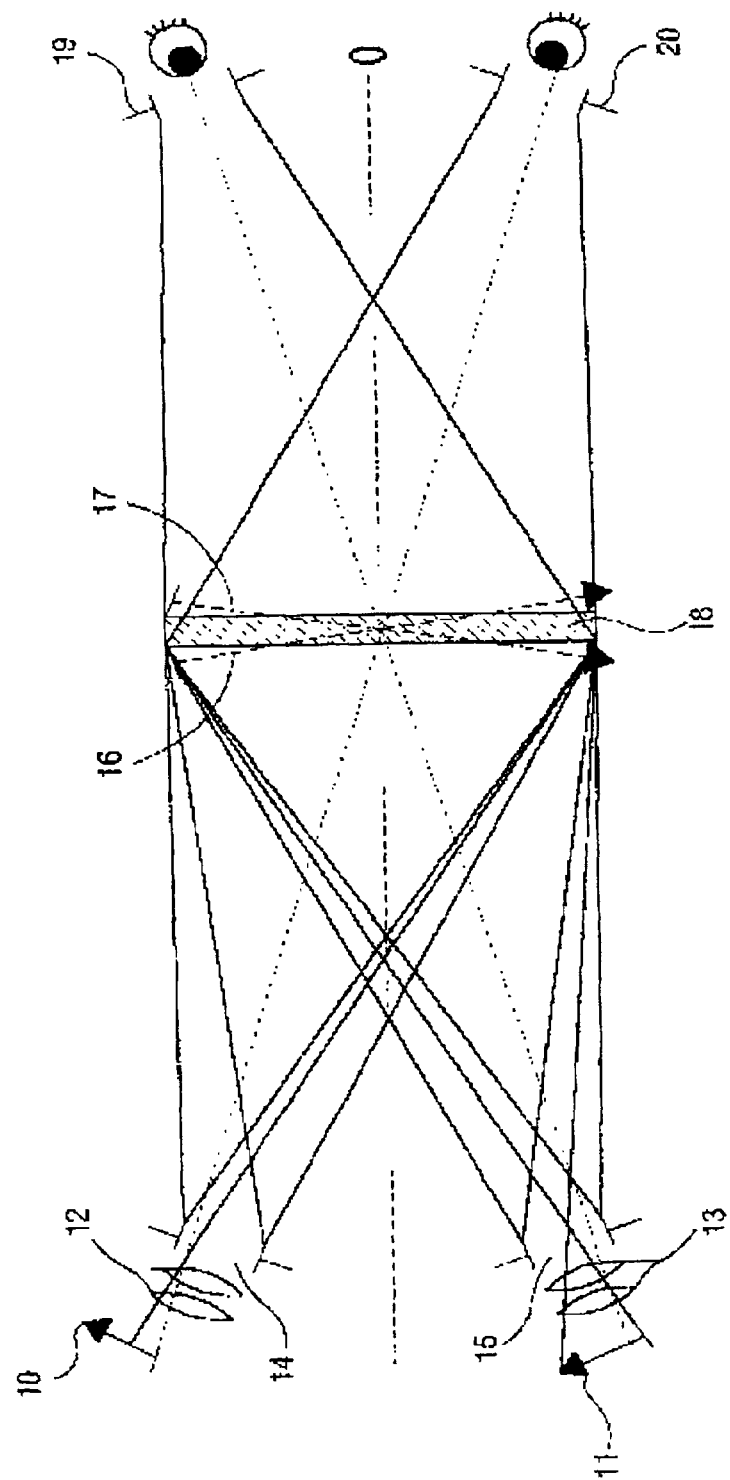
FIG. 2 is for showing a principle of forming a viewing zone of an image projection screen having characteristics of a lens.

FIG. 2 is for showing a principle how the viewing zone is formed in case of projecting image on an image projection screen having lens characteristics.

As shown in FIG. 2, a first object 10 and a second object 11 are shown as images 16, 17 of projection lens 12, 13 and egress opening units 14, 15 respectively onto an image projection screen 18. The image projection screen 18 forms the images of the egress opening units 14, 15 of the projection lens 12, 13 on a first viewing zone 19 and a second viewing zone 20.

Figure 3A:
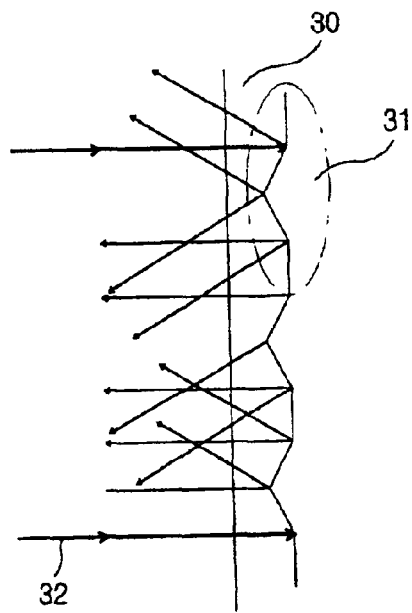
FIGS. 3A, 3B and 3C show configurations of prism panels in accordance with one embodiment of the present invention.

FIG. 3A is for illustrating a configuration of a prism panel applied to a 3-dimentional image projection screen of the present invention.

Figure 3B:
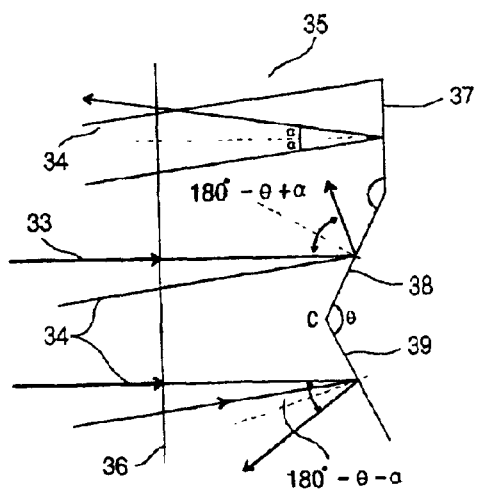

FIG. 3B is for illustrating a reflection effect of an incident beam according to a configuration of a prism cell, in case that the prism cell is a reflective type.

Figure 3C:
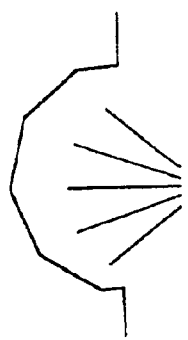

FIG. 3C shows a configuration of a prism cell having a disperse surface of an incident beam corresponding to the number of required viewing zones.

As shown in FIG. 3A, the prism panel 30 of the present invention has an 1-dimentional or 2-dimentional arrangement in which the prism cells 31 are in contact each other for dispersing the incident beam 32 to different directions.

As shown in FIG. 3B, when the prism cell 31 is in use of reflection, a surface 35 of the prism cell should be coated to reflect the incident beam completely. The number of the disperse surfaces in the prism cell 31 is corresponding to the number of the required viewing zones as shown in FIG. 3, and the surfaces are in contact each other at a constant angle.

Referring to FIG. 3B, reflection and transmission characteristics of the incident beam is explained now in either case that the prism cell is a reflective type and transmitting type.

When the prism cell is a spherical reflective type, a front surface 36 of the prism, or two disperse surfaces 38, 39 which are not parallel to the incident surface of the beam are symmetric to a normal direction of the prism panel 30 and when an angle therebetween is θ, the bean 34 on the paper plane incident at an angle α to the normal direction 33 is reflected at an angle of [180°−θ+α] to the normal direction 33 on the disperse surface 38 and is reflected at the angle of [180°−θ−α] on the disperse surface 39. And the beam 34 is reflected at an α angle on the disperse surface 37 parallel to the front surface 36 of the prism. Therefore, preferably, the angle θ should be as close as 180° in order to remove the reflection effect generating between the disperse surfaces.

In addition, in case that the prism cell is a transmitting type, the surface 35 of the prism cell 31 does not require the reflective coating. In that case, if the refractivity of the prism cell is n, a transmitting angle of the incident beam to the disperse surface is $\sin^{-1}\{n\cos(\theta/2-\alpha)\}$ in case of the disperse surface 38 of the FIG. 3b, and $\sin^{-1}\{n\cos(\theta/2+\alpha)\}$ in case of the disperse surface 39 and $\sin^{-1}(n\sin\alpha)$ in case of the disperse surface 37. Accordingly, the position of each viewing zone can become closer or farther in accordance with the angle θ.

In accordance with the reflecting or transmitting characteristics of the prism cell positions of various directions and the number of the viewing zones which are required for forming the viewing zone of the 3-dimentional imaging screen for multi-viewer, may be determined.

Figure 4:
FIG. 4 shows configurations of various types of prisms forming a prism panel of the present invention.
Figure 4:
Figure 4:
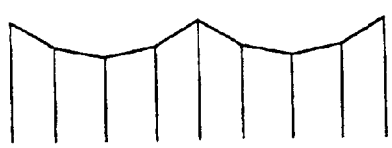
Figure 4:
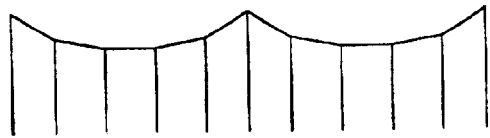
Figure 4:
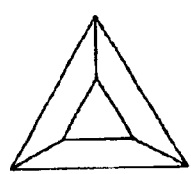
Figure 4:
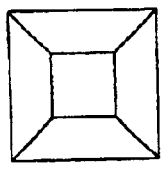
Figure 4:
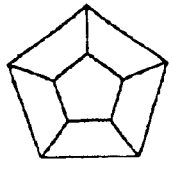
Figure 4:
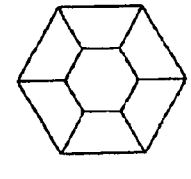

FIG. 4 is for illustrating various types of prism cells applied to the 3-dimensional image screen for multi-viewer of the present invention.

When requiring the viewing zone to be positioned in a vertical or horizontal direction, the prism cells can be applied to have various embossing or engraving shapes according to the number of the viewing zones. In other words, when the number of the viewing zones is 2, the prism cell has a triangle shape (a), when the number of the viewing zones is 3, the prism cell has a dove shape (b), when the number of the viewing zones is 4, the prism cell has a tetragonal type (d), when the number of the viewing zones is 5, the prism cell has a pentagonal type (d), and etc. The length of the prisms is at least the same as or longer than the height of the image projection screen. In addition, it is preferred that the width of the prism cells is narrower than a width of one pixel which is projected on the image projection screen in case that the prism cell has 2-dimensional arrangement. It is the reason that the resolution thereof would be degraded when the width is larger than a single pixel size. However, the width and the number of the disperse surfaces should be selected to minimize the diffraction phenomena because the viewing zone of each viewing point can be overlapped by the diffraction according to each disperse surface in case of multi-viewing zone image when a pitch or width of the disperse surface is too small.

Additionally, in case of requiring that the position of the viewing zone is to be formed to vertical, horizontal and middle directions at the same time, the prism cell has types of truncated triangular pyramid (e), a truncated tetragonal pyramid (f), a truncated pentagonal pyramid (g), a truncated hexagonal pyramid (h), and etc. having various embossing and engraving shapes according to the required number of viewing zones. In this case, the projection on the respective disperse surface should be applied to have same area in order to maintain the same brightness of each viewing zone. And it is preferred that the width of the prism cell is smaller than a width of a single pixel of an image projected on the image projection screen in case that the prism cell has 2-dimensional arrangement. When the width is larger than a single pixel, the resolution is degraded. However, because, when a pitch or the width of the disperse surface is too small, the viewing zones can be overlapped owing to a diffraction of each disperse surface in a multi-viewing case, the width and the number of the disperse surface should be selected to minimize the diffracting phenomena.

Figure 5:
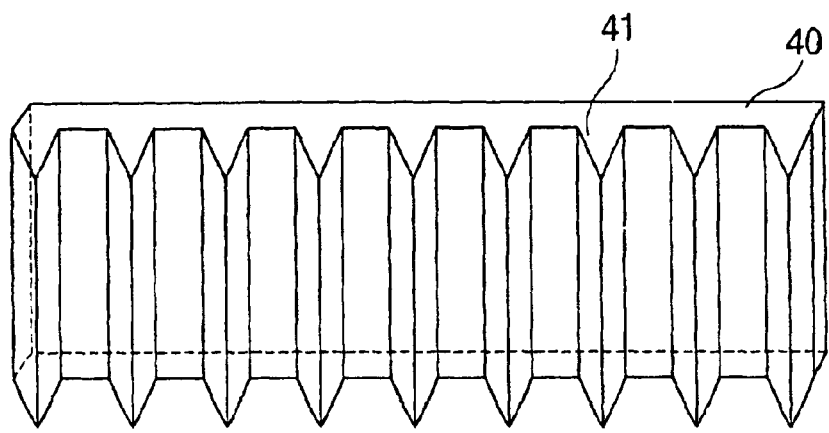
FIG. 5 shows a configuration of a 3-viewing zone prism panel according to another embodiment of the present invention.

FIG. 5 shows an example in which the prism cell in an 1-dimensional arrangement has a 3-viewing zone prism panel according to another embodiment of the present invention. By way of the prism panel 40 of FIG. 5, the prism cell 41 of a truncated triangular pyramid type having various embossing and engraving shapes has an 1-dimensional arrangement such that it is capable of generating the 3 viewing zone to a desired vertical or horizontal direction.

Figure 6:
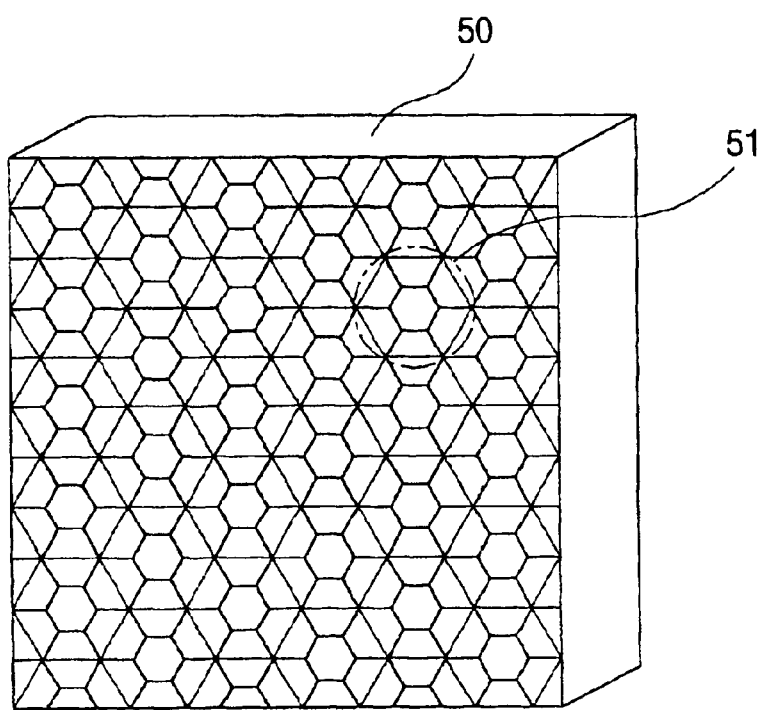
FIG. 6 shows a configuration of a 7-viewing zone prism panel according to still another embodiment of the present invention.

FIG. 6 shows an example in which the prism cell in a 2-dimentional arrangement has a 7-viewing zone panel according to still another embodiment of the resent invention. According to a prism panel 50 of FIG. 6, the prism cell 51 of a truncated hexagonal pyramid (h) type having various embossing and engraving shapes has a 2-dimensional arrangement in order to form 7-viewing zones in upper, lower, leit, right and center directions which are determined by a relative positions of the disperse surfaces in the prism cell 51. In this case, the prism panel can be rotated to form the viewing zone to a desired direction. And an angle between the prism cells should be near to 180° in order not to cause the reflection effect therebetween.

Now, it will be explained about configurations and operations of embodiments of the 3-dimentional image screen for multi-viewer which employs a prism panel having prism cells applied to the 3-dimentional image screen for multi-viewer of the present invention, in detail.

Figure 7A:
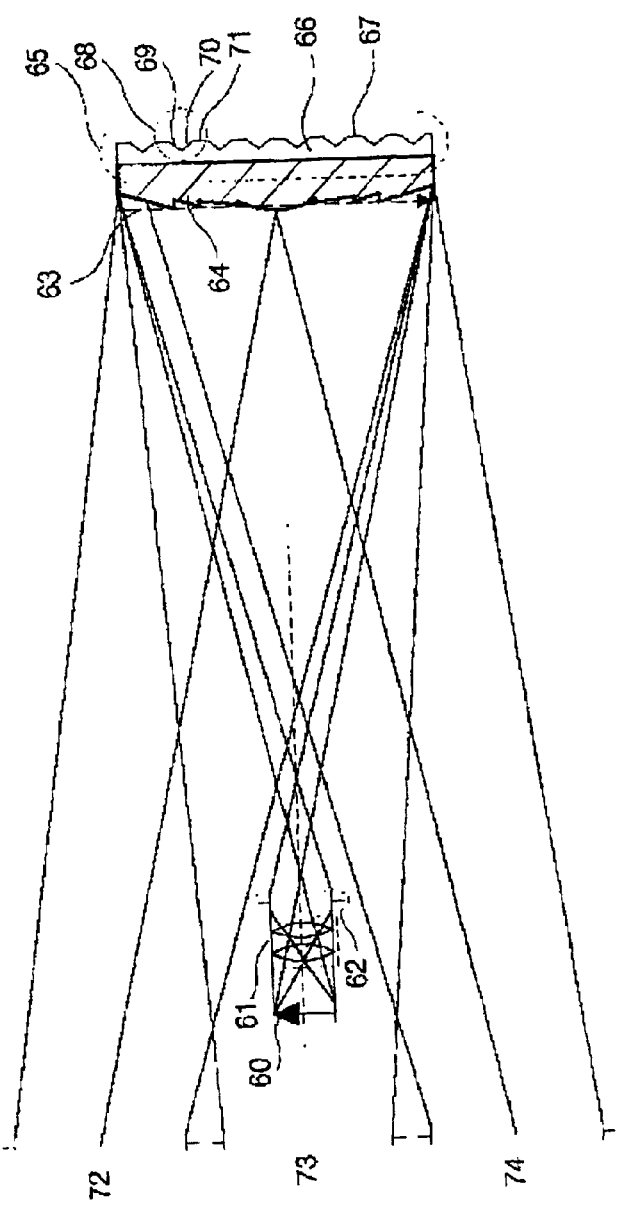
FIGS. 7A and 7B are for illustrating an embodiment of 3-dimentional image screen for multi-viewer of the present invention.
Figure 7B:

FIGS. 7A and 7B show embodiments that the viewing zone is formed by a prism panel having a reflective coating and a 3-dimentional image screen for multi-viewer of the present invention.

The screen of the present invention shown in FIG. 7 comprises an object 60 to be projected, a projection lens 61 installed apart from the object 60 at a constant distance, an egress opening unit 62 installed adjacent to a projecting direction of the projection lens 61, a 3-dimentional image projection screen 64 for transmission installed opposite to and apart from the object 60 at a constant distance, and a prism panel 66 formed by prism cells 68 coupled to an even surface which is a rear surface of the 3-dimentional image projection screen 64.

The 3-dimentional image projection screen is made by a transparent material such as a flannel lens or a projective holographic screen. In addition, the prism cell 68 of the prism panel 66 is configured by arranging the prism cell having the truncated triangular pyramid (e) type for generating a 3-viewing zone in an 1-dimentional arrangement.

To describe an operation of generating a viewing zone on the screen of the present invention having the above configuration, a beam for the object 60 projected by the light source (not shown in figure) is focused and diffused through the projection lens 61 and the egress opening unit 62 and then projected as an image on the 3-dimentional image projection screen 64. The beam providing the projected image 63 on the 3-dimentional image projection screen 64 is reflective by the disperse surfaces 69, 70, 71 of the respective prism cell 68 of the prism panel 66 coupled to the rear of the 3-dimentional image projection screen 64, then is dispersed to 3 other directions in order to form an image of the egress opening 62, or the viewing zone, in a position of the projection lens 61. In this case, the first viewing zone 72 is form by the disperse surface 71 of the prism cell 68, the second viewing zone 73 is formed by the disperse surface 69, and the third viewing zone 74 is formed by the disperse surface 70.

In order to move a position of the viewing zone in this case, a thickness of the prism panel 66 is not constant, but can be decreased or increased to a width or height direction. In other words, the position of the viewing zone is moved proportional to a change of thickness of the prism panel.

In addition, the prism panel 66 is coupled to the even rear surface of the 3-dimentional image projection screen 64 of the 3-dimentional image screen for multi-viewer in order to form the above viewing zone, referring to FIG. 7a. It is not concerned that the screen 64 may be coupled to an even surface of the prism panel 66 or to a surface of the prism panel having the embossing and engraving shapes. It is the reason that the surface having the embossing and engraving shapes of the prism cell has a reflective coating formed on a surface thereof, in case of reflective type.

Additionally, it is possible to form the prism cell on the even rear surface of the 3-dimentional image projection screen 64 by embossing or engraving the even rear surface. In this case, the thickness of the 3-dimentional image projection screen 64 should be enough not to have the moir_interference pattern.

The 3-dimentional image projection screen 64 and the prism panel 66 may be contacted each other or be apart from each other having a constant distance. When requiring the constant distance between the 3-dimentional image projection screen 64 and the prism panel 66, the distance should be adjusted properly not to have an interference effect such as moir_interference pattern which may be generated on the 3-dimentional image projection screen 64 by the reflective beam of the disperse surface of the prism cell according to the configuration of the 3-dimentional image projection screen 64.

Figure 8:
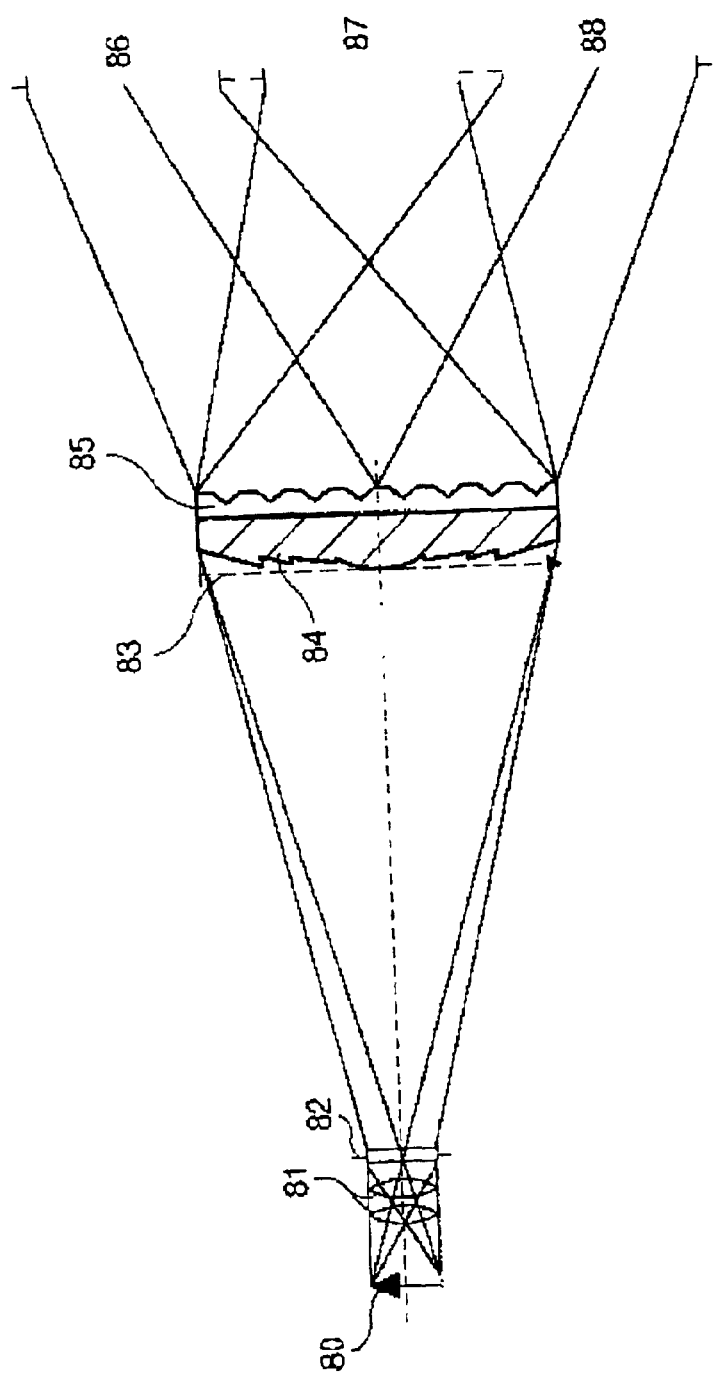
FIG. 8 is for showing still another embodiment of 3-dimentional image screen for multi-viewer of the present invention.

FIG. 8 is for illustrating how the viewing zone is generated by the configuration of the 3-dimentional image screen for multi-viewer when the screen is a transmitting type.

Referring to FIG. 8, the screen comprises an object 80 to be projected, a projection lens 81 installed apart from the object 80 at a constant distance, an egress opening unit 82 installed adjacent to a projecting direction of the projection lens 81, a 3-dimentional image projection screen 84 installed apart from the object 80 at a constant distance, and a prism panel 85 formed by a transmitting prism cell coupled to a rear surface of the 3-dimentional image projection screen 84.

The type, configuration and coupling state of the 3-dimentional image projection screen 84 and the prism panel 85 are identical to those in FIGS. 7A and 7B. However it is different only in this point not to form a reflective coating on the surface of the prism cell such that the prism cell serves in a transmitting type.

Accordingly, the viewing zones are formed at an opposite position to the projection lens 81 by the projection screen of the present invention. That is, it can be seen that the first viewing zone 86, the second viewing zone 87, and the third viewing zone 88 are created at a position constant apart from the prism panel in a predetermined distance.

As described above, by coupling the 3-dimentional image screen, comprised by the flannel lens or the projective holographic screen and various types of the prism cells, on the prism panel having the 1-dimentional or 2-dimentional arrangement, the present invention provides an advantage that the number of viewing zones and the location can be formed according to the prism cell, as desired. And also, according to the screen of the present invention, it may be efficient that the multi-viewer may watch the image on the single screen without any damage of the resolution of the display by configuring the size of the disperse surface of the prism cell after determining and adjusting relationship with the size of the single pixel of the image.

The present invention is not limited to the specifically disclosed embodiments, and variations and modifications may be made without departing from the scope of the present invention.

What is claimed is:

1. A three dimensional imaging screen that projects an object on a screen such that three-dimensional images are viewable in a plurality of viewing zones, the screen comprising:

a three-dimensional image projection screen positioned along a direction of a beam of the image; and a prism panel comprising a plurality of prism cells, each of said plurality of prism cells having a plurality of dispersive surfaces onto which the beam of the image is incident, the prism panel positioned adjacent to a rear surface of the three-dimensional image projection screen, whereby the number of viewing zones, each of which accommodates at least one viewer, corresponds to the number of the dispersive surfaces of each prism cell.

2. The three-dimensional imaging screen as recited in claim 1, wherein the prism panel is coupled to the rear surface of the three-dimensional image projection screen, and the three-dimensional image projection screen has a thickness configured to not generate an interference effect.

3. The three-dimensional imaging screen as recited in claim 2, wherein the interference effect comprises a moire pattern.

4. The three-dimensional imaging screen recited in claim 1, wherein the prism panel is positioned with respect to the rear surface of the three-dimensional image projection screen with a predetermined distance between the prism panel and the rear surface, and the predetermined distance between the rear surface of the three-dimensional image projection screen and the prism panel is configured to not generate an interference effect.

5. The three-dimensional imaging screen as recited in claim 4, wherein the interference effect comprises a moire pattern.

6. The three-dimensional imaging screen as recited in claim 1, wherein the prism panel is integral with the rear surface of the three-dimensional image projection screen, the cells being provided as one of embossments and engravings, and the three-dimensional image projecting screen has a thickness configured to not generate an interference effect.

7. The three-dimensional imaging screen according to claim 6, wherein the interference effect comprises a moire pattern.

8. The three-dimensional imaging screen as recited in claim 1, wherein the prism panel is configured such that a prism cell having a size corresponding to a size of one pixel of the projected image on the three-dimensional image projection screen is provided as one of an embossment and an engraving in a 1-dimensional arrangement.

9. The three-dimensional imaging screen as recited in claim 8, wherein a height of a prism cell is at least equal to a height of the three-dimensional image projection screen, and a width of the prism cell is at most equal to a width of one pixel of the projected image on the three-dimensional image projection screen.

10. The three-dimensional imaging screen as recited in claim 8, wherein a width of a prism cell is wider than a width of a pixel of the projected image on the three-dimensional image projection screen.

11. The three-dimensional imaging screen as recited in claim 8, wherein the prism cells are configured as one of a triangular prism, a dove prism, a tetragonal prism, a pentagonal prism, and a hexagonal prism in accordance with the number of viewing zones.

12. The three-dimensional imaging screen as recited in claim 1, wherein the prism panel is configured such that a prism cell having a size corresponding to a size of one pixel of the projected image on the three-dimensional image projection screen is provided as one of an embossment and an engraving in a two-dimensional arrangement.

13. The three-dimensional imaging screen as recited in claim 12, wherein a cross-sectional area of a prism cell is at most equal to an area of the pixel of the projected image on the three-dimensional image projection screen.

14. The three-dimensional imaging screen as recited in claim 12, wherein a cross-sectional area of a prism cell is greater than an area of the pixel of the projected image on the three-dimensional image projection screen.

15. The three-dimensional imaging screen as recited in claim 12, wherein the cell are configured as one of a triangular prism, a tetragonal prism, a pentagonal prism, and a hexagonal prism, in accordance with a number of viewing zones.

16. The three-dimensional imaging screen as recited in claim 1, wherein a thickness of the prism panel is one of constant and variable with a constant ratio with respect to one of a width and height direction.

17. The three-dimensional imaging screen as recited in claim 16, wherein a prism cell has a reflective coating on a surface thereof.

18. The three-dimensional imaging screen as recited in claim 17, wherein an angle between the dispersive surfaces of a prism cell is near 180°.

* * * * *

UNITED STATES PATENT AND TRADEMARK OFFICE
CERTIFICATE OF CORRECTION

PATENT NO. : 6,700,701 B1
DATED : March 2, 2004
INVENTOR(S) : J. Son et al.

It is certified that error appears in the above-identified patent and that said Letters Patent is hereby corrected as shown below:

Column 8,
Line 51, "the cell" should be -- the prism cells --.

Signed and Sealed this

Thirtieth Day of November, 2004

JON W. DUDAS
*Director of the United States Patent and Trademark Office*